US007886276B2

(12) United States Patent
Tai et al.

(10) Patent No.: US 7,886,276 B2
(45) Date of Patent: Feb. 8, 2011

(54) APPLICATION PROGRAM DEVELOPMENT ASSISTING METHOD, PROGRAM, AND INFORMATION PROCESSING APPARATUS

(75) Inventors: Hideki Tai, Yokohama (JP); Mari Abe, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 11/318,718

(22) Filed: Dec. 27, 2005

(65) Prior Publication Data

US 2009/0183141 A1  Jul. 16, 2009

(30) Foreign Application Priority Data

Dec. 28, 2004  (JP) .............................. 2004-380298

(51) Int. Cl.
*G06F 9/44* (2006.01)

(52) U.S. Cl. ..................... 717/125; 717/132; 717/126

(58) Field of Classification Search .......... 717/104–167
See application file for complete search history.

(56) References Cited

U.S. PATENT DOCUMENTS

| 6,745,383 | B1 * | 6/2004 | Agarwal et al. ............. 717/132 |
| 6,829,758 | B1 * | 12/2004 | Lewontin et al. ............ 717/107 |
| 7,418,734 | B2 * | 8/2008 | Berg et al. .................... 726/25 |
| 7,426,717 | B1 * | 9/2008 | Schang et al. ................ 717/124 |
| 7,430,670 | B1 * | 9/2008 | Horning et al. .............. 713/190 |
| 2005/0015752 | A1 * | 1/2005 | Alpern et al. ................ 717/131 |
| 2005/0081192 | A1 * | 4/2005 | DeLine et al. ............... 717/126 |
| 2005/0273861 | A1 * | 12/2005 | Chess et al. ..................... 726/25 |
| 2006/0136098 | A1 * | 6/2006 | Chitrapura et al. .......... 700/262 |
| 2009/0307665 | A1 * | 12/2009 | Sharma et al. ............... 717/124 |

FOREIGN PATENT DOCUMENTS

| JP | H08-069380 A | 3/1996 |
| JP | 2001-344105 A | 12/2001 |
| JP | 2001-344205 | 12/2001 |
| JP | 2003-15870 A | 1/2003 |

OTHER PUBLICATIONS

Ueli Wahli, et al., "Servlet and JSP Programming with IBM WebSphere Studio and VisualAge for Jaa", May 16, 2000, IBM Rebbooks, Ch 5 and 10.*

Takagiwa, et al., "Exploring WebSphere Studio Application Developer Integration Edition V5," Aug. 8, 2003, IBM Redbooks, Ch 5 and 6.*

Chien-Hung Liu, "Data Flow Analysis and Testing of Java Server Pages," 28th Annual International Computer Software and Applications Conference, Sep. 2004, pp. 114-119, vol. 2.

* cited by examiner

*Primary Examiner*—Wei Y Zhen
*Assistant Examiner*—Chung Cheng
(74) *Attorney, Agent, or Firm*—Van N. Nguy, Esq.; Ryan, Mason & Lewis, LLP

(57) ABSTRACT

A method, program, and information processing apparatus for detecting an inconsistency in an application program before the application program is implemented. The described is detecting a consistency or inconsistency in the design of screen transition of an application program, by generating a control flow graph for the application program, calculating from the control flow graph the solution of dataflow problem which occurs in the application program, detecting an inconsistency in the application program on the basis of the calculated solution, and displaying information concerning a detected inconsistency.

26 Claims, 13 Drawing Sheets

[Figure 1]
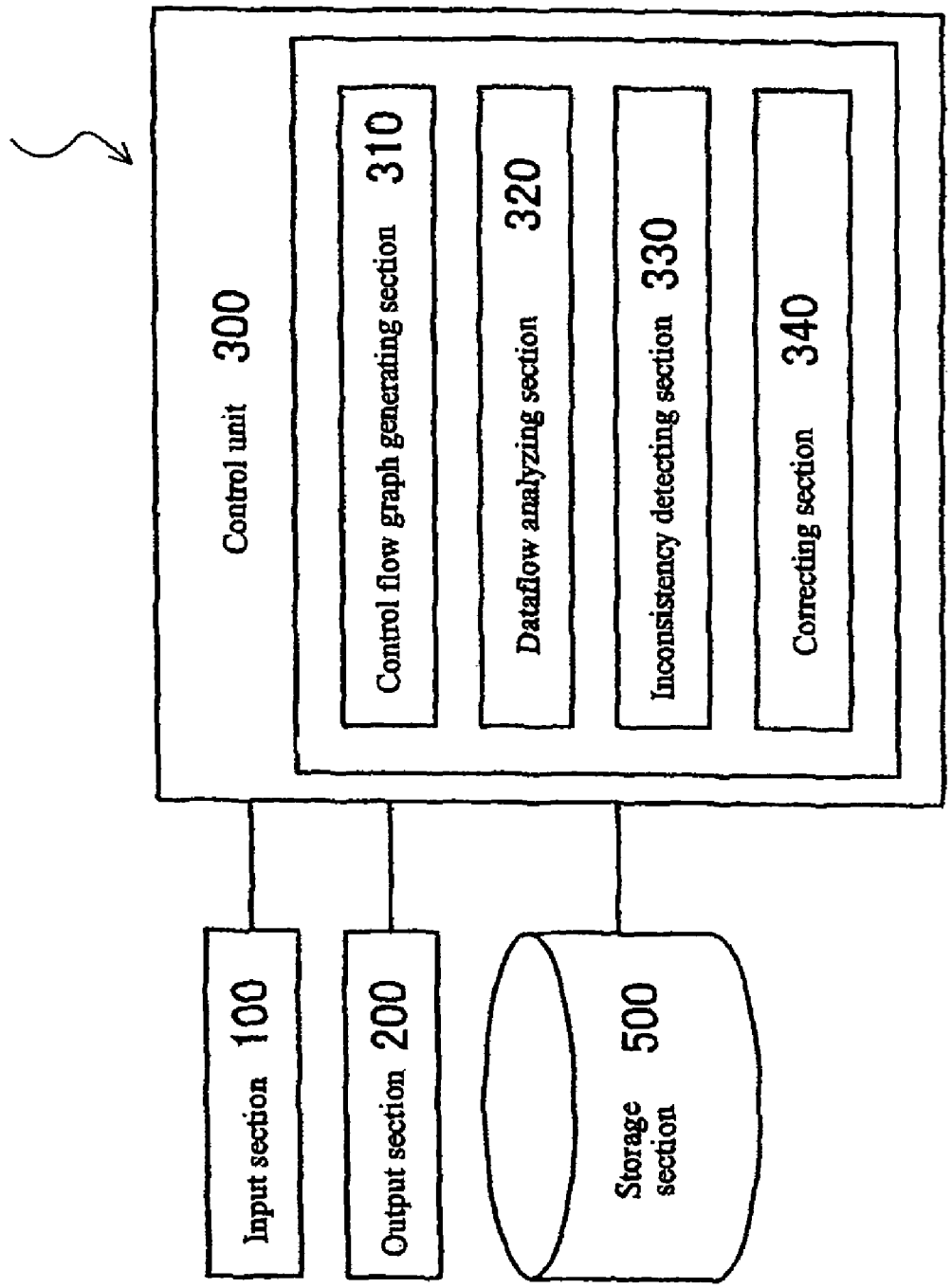

[Figure 2]
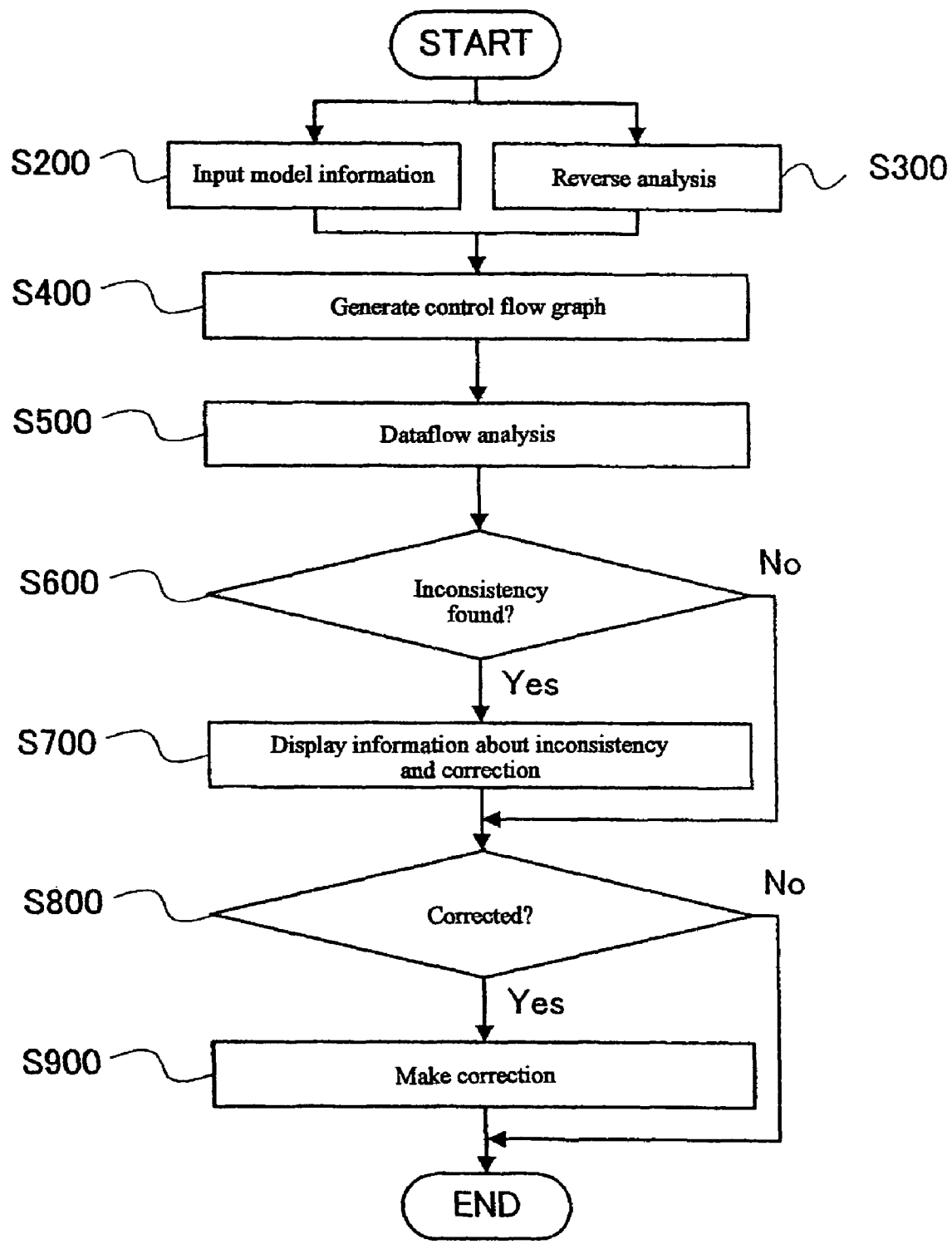

[Figure 3]
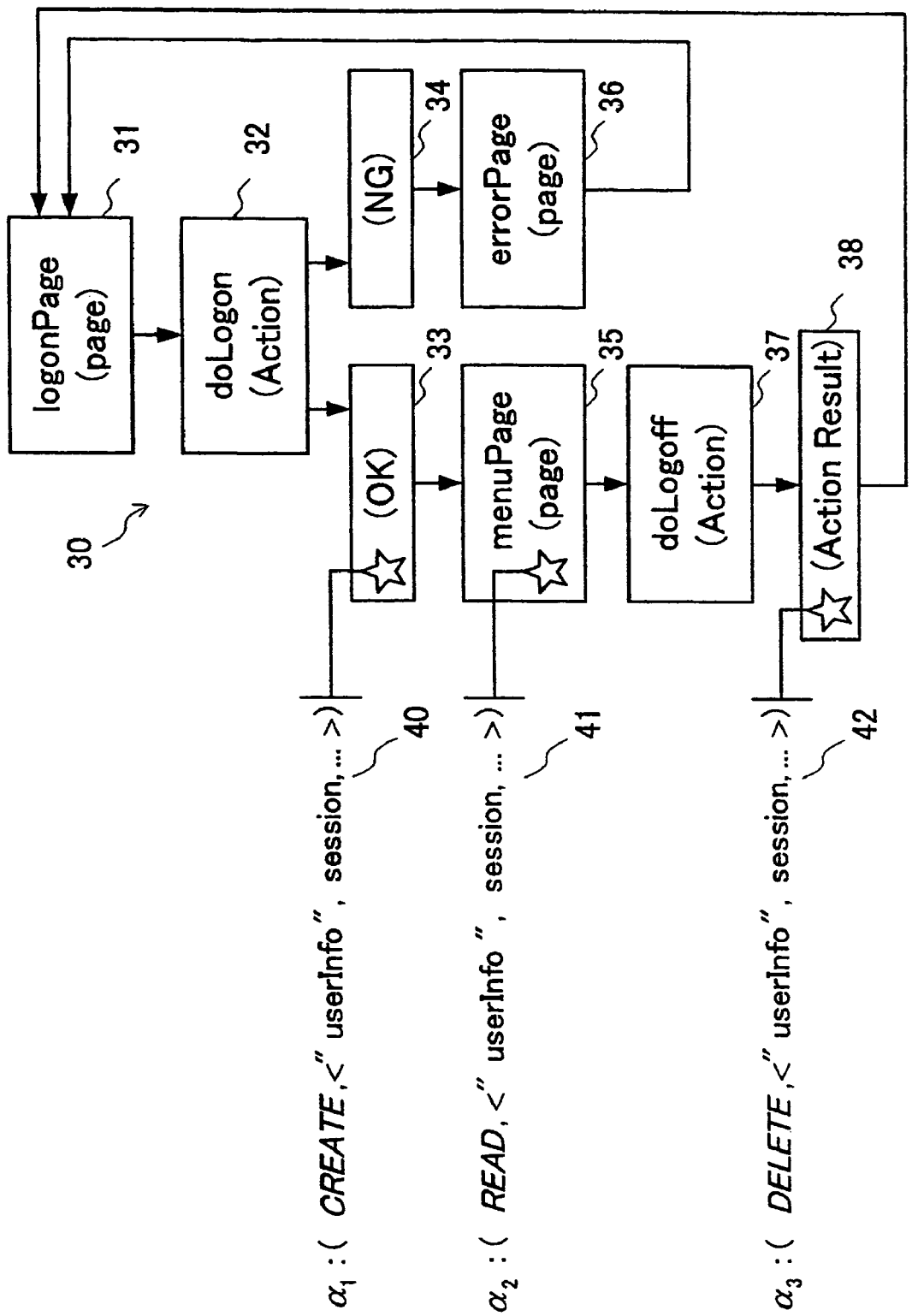

[Figure 4]
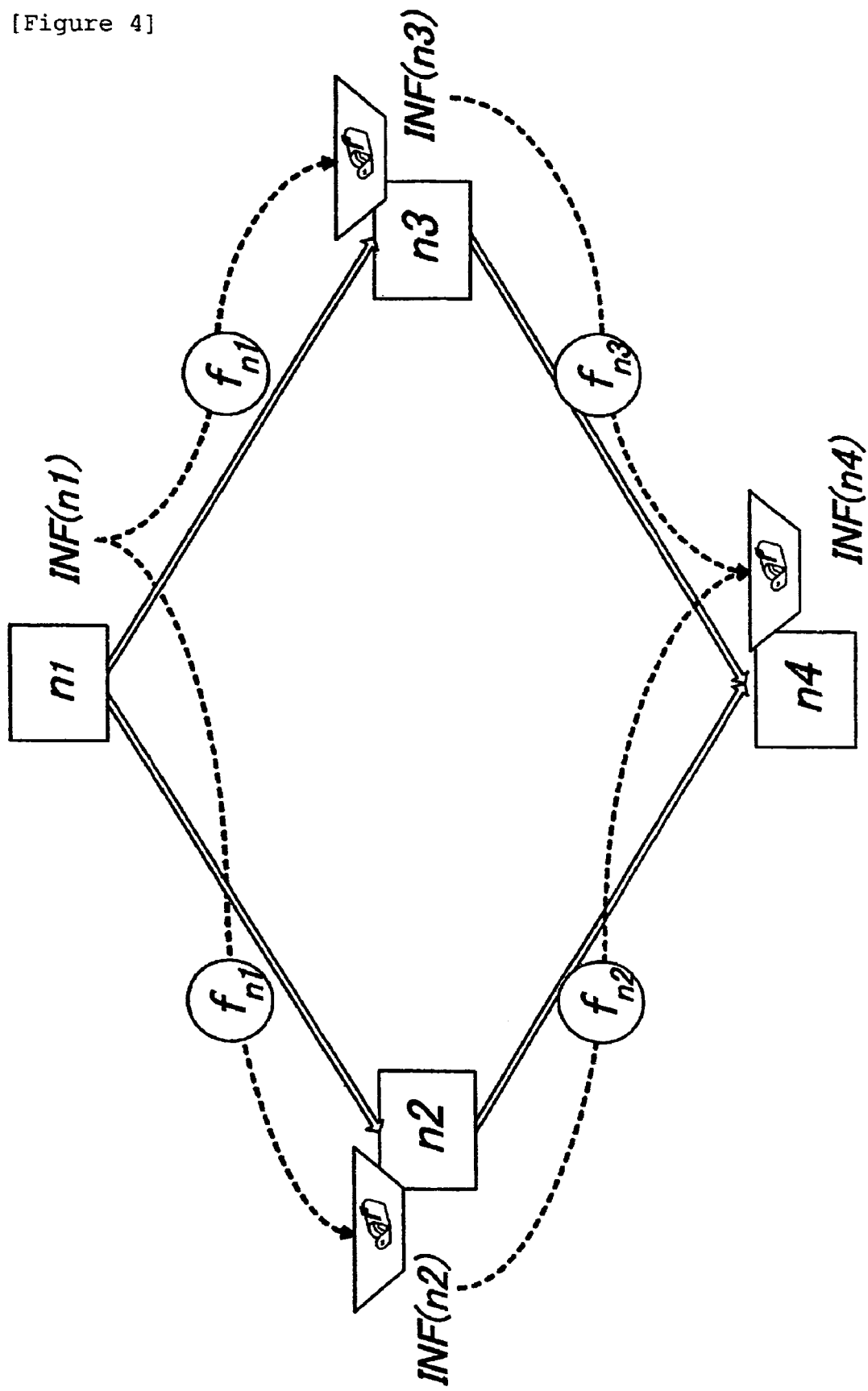

[Figure 5]
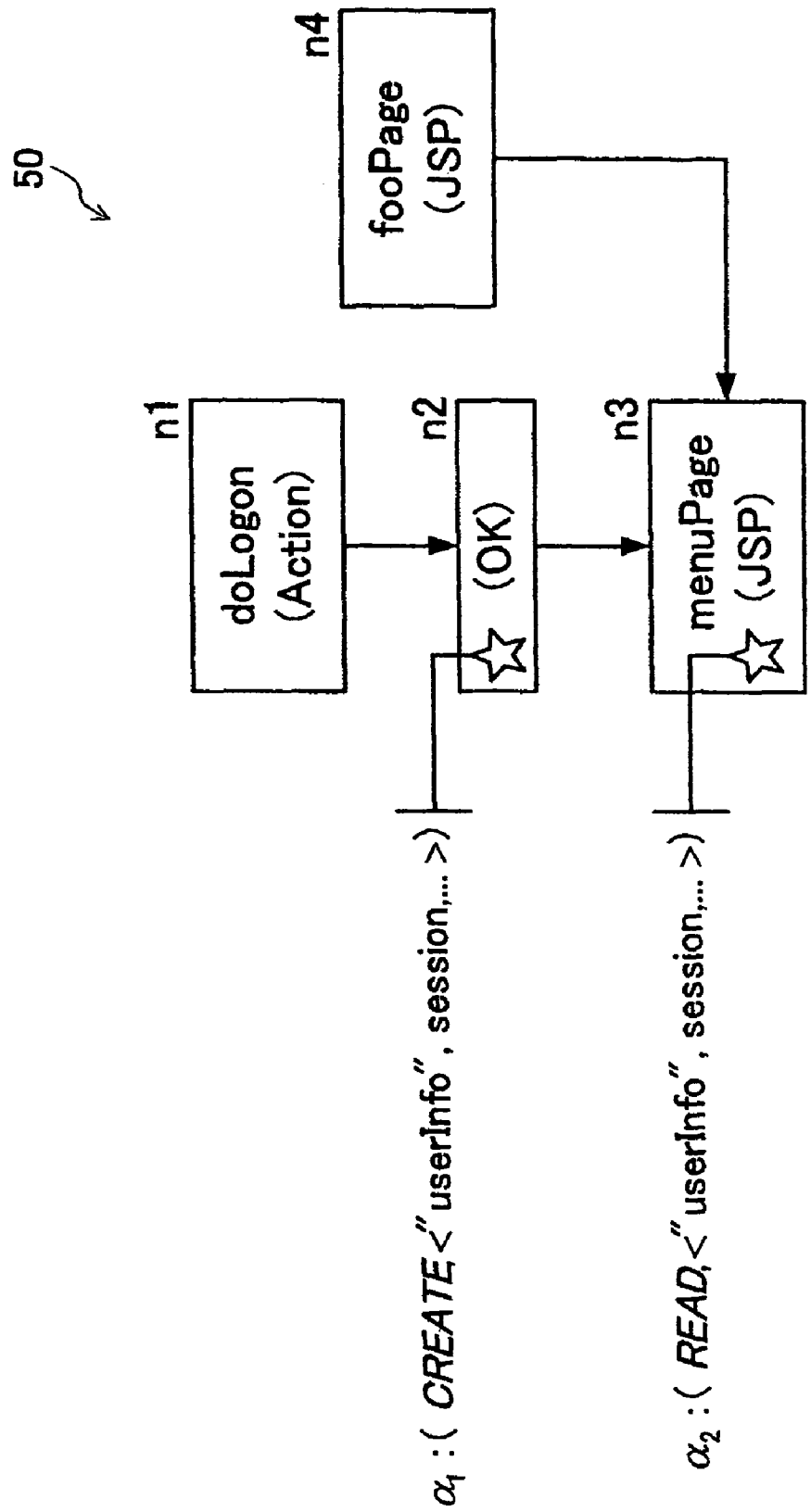

[Figure 6]
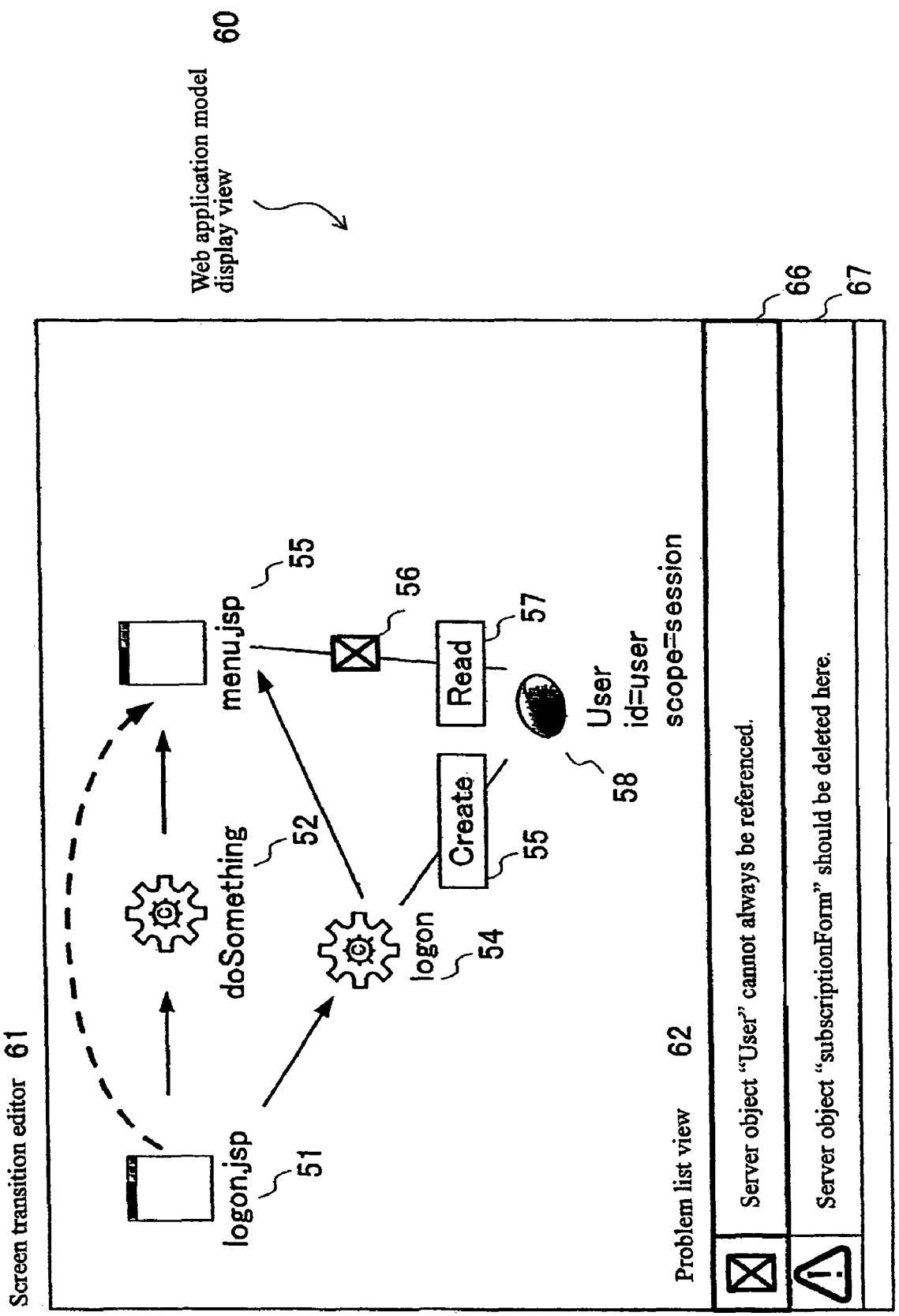

[Figure 7]
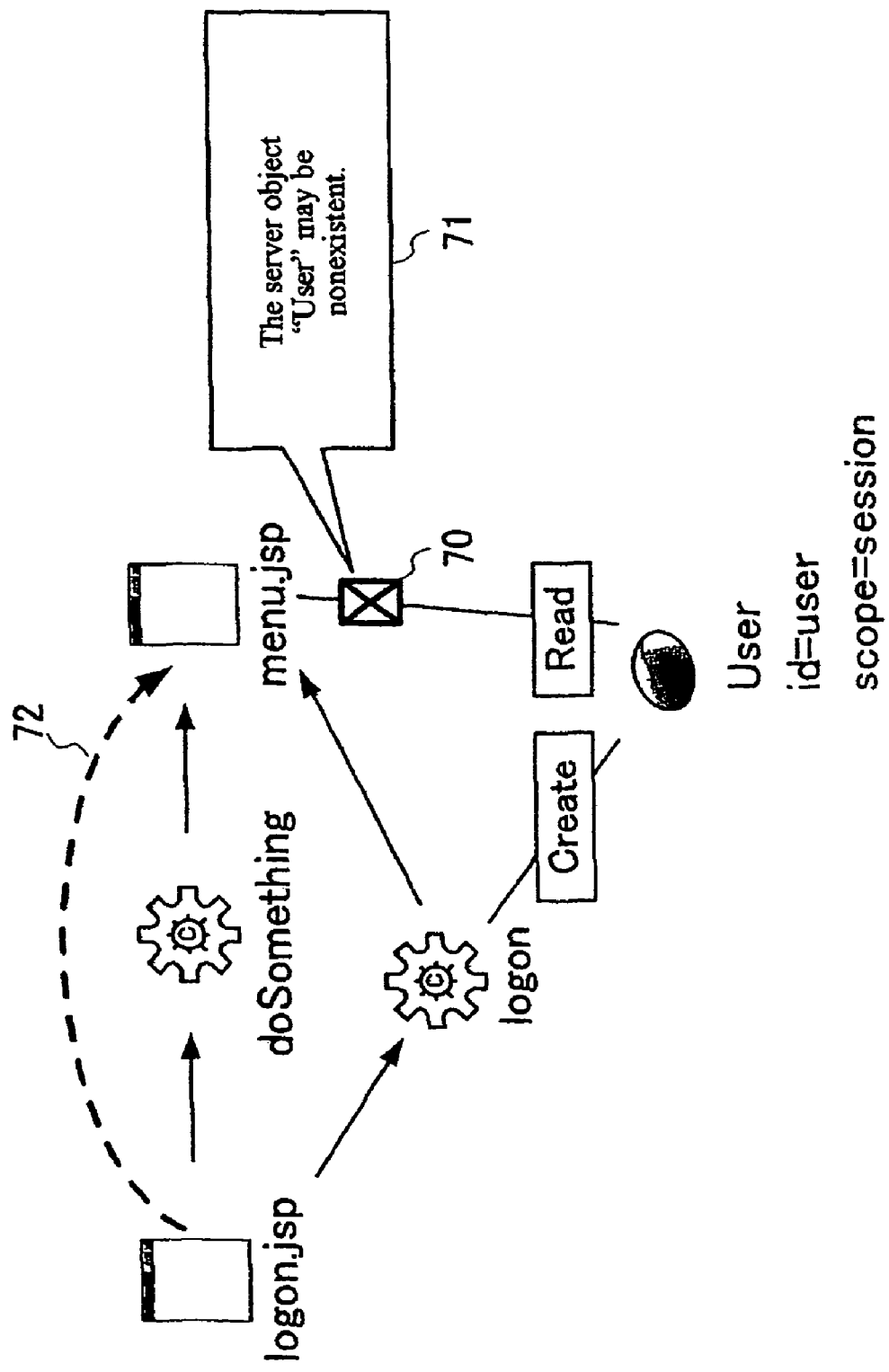

[Figure 8]
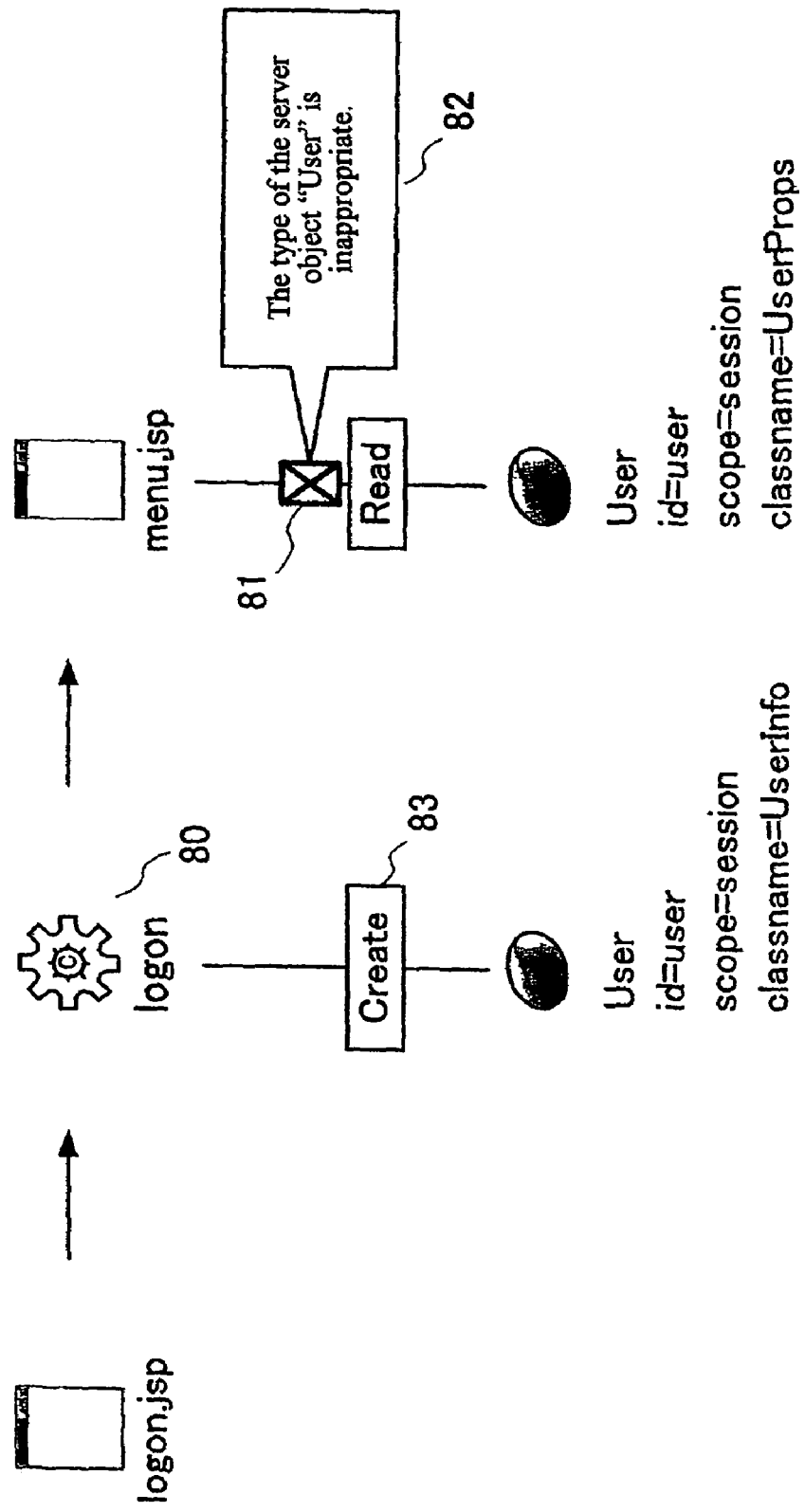

[Figure 9]
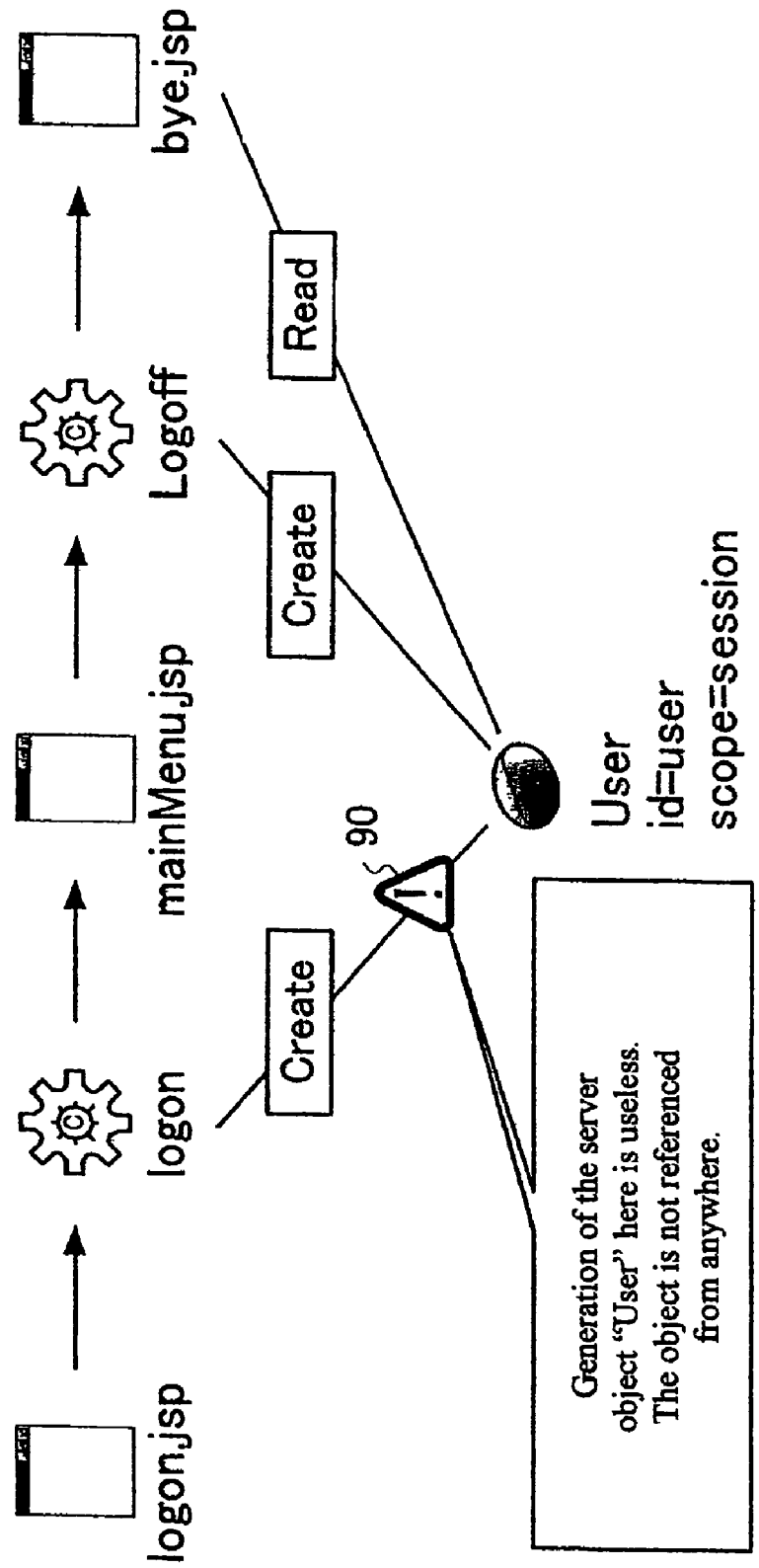

[Figure 10]
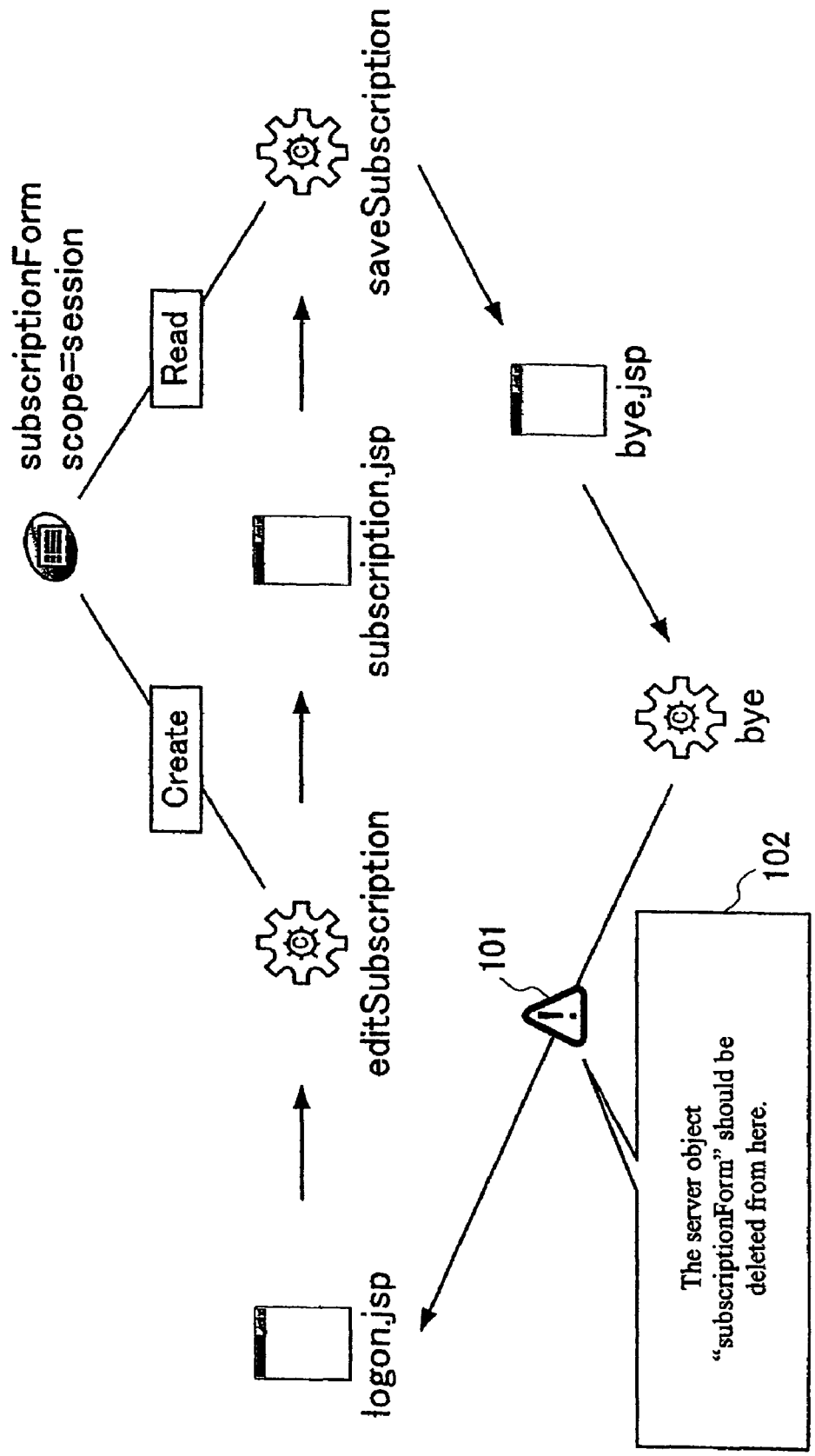

[Figure 11]
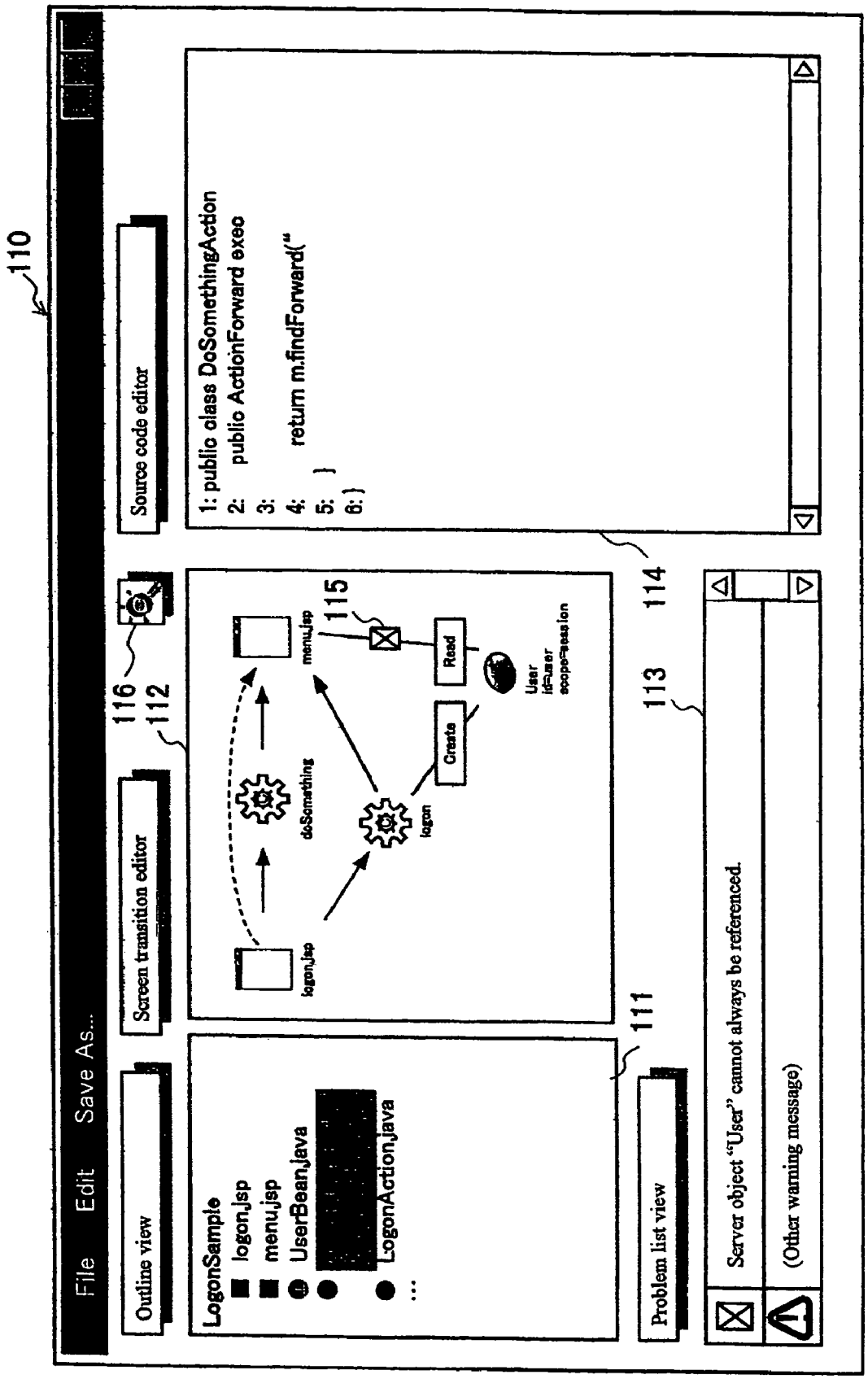

[Figure 12]

| Possible corrections 120 | |
|---|---|
| ▲ Select a correction … | |
| ● Add a code generating the server object (User, id=user, scope=session) to DoSomethingAction.java | 580 |
| ■ Add a code generating the server object (User, id=user, scope=session) to menu.jsp | 581 |
| ■ Add a presence/absence condition of the server object (User, id=user, scope=session) to menu.jsp | 582 |

[Figure 13]
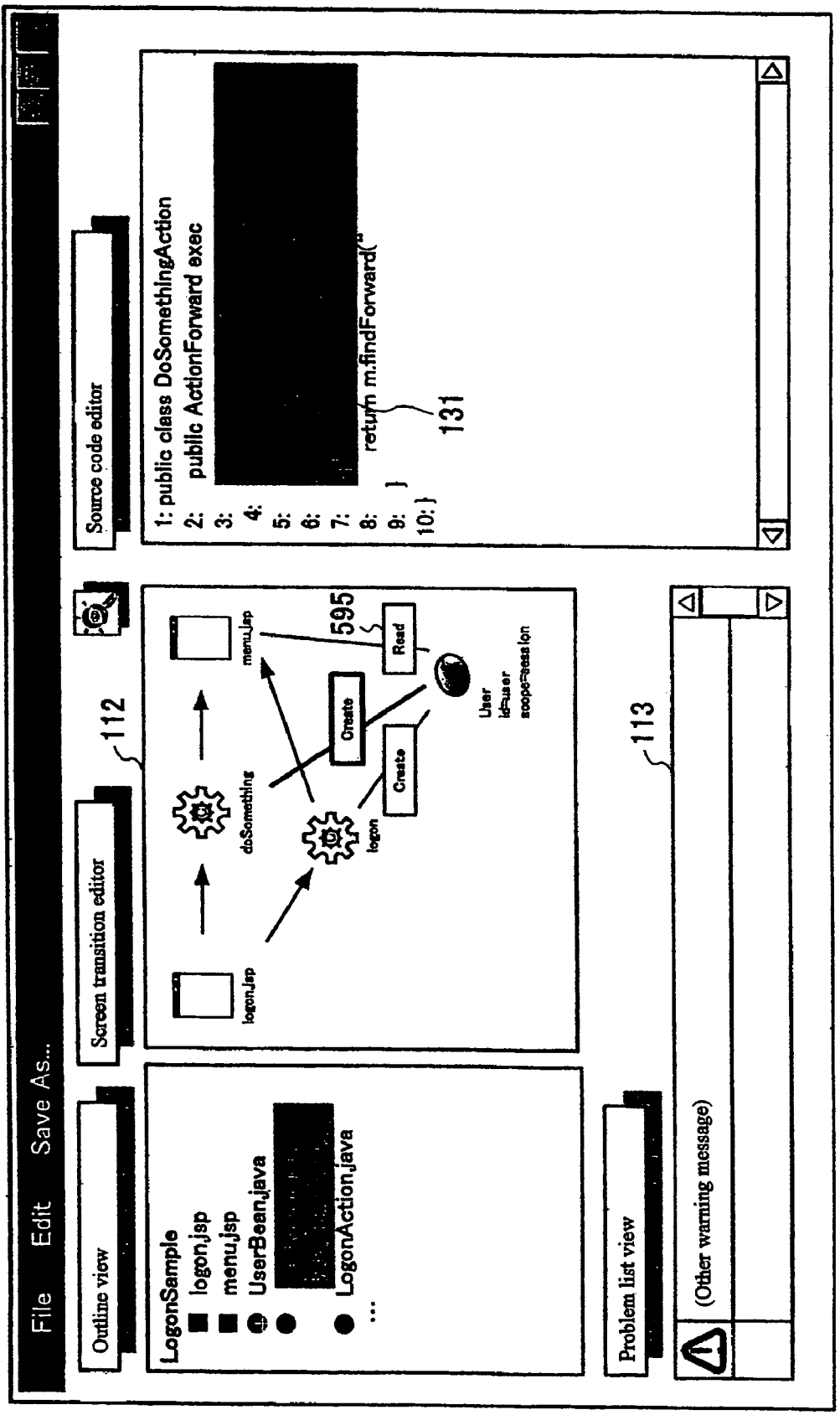

APPLICATION PROGRAM DEVELOPMENT ASSISTING METHOD, PROGRAM, AND INFORMATION PROCESSING APPARATUS

BACKGROUND

1. Field of the Invention

The present invention relates to a method, an information processing apparatus, and a program for assisting the development of an application program. In particular, the present invention relates to a method, an information processing apparatus, and a program for detecting a consistency in the design of screen transition of a Web application program.

2. Background Art

Methods for assisting the development of application programs have been known. For Web applications, systems using ServerSide Java (registered trademark) techniques are becoming common; especially, system development using Servlets is becoming mainstream. A Servlet is an application program that runs on a server, processes on the server a request sent from a client (Web browser), and returns the result of the processing to the client.

In a system using a typical Servlet, the Servlet is activated in response to a request sent from a Web browser, and a database is accessed from the server, or data is processed using the result of such access. Also, the Servlet takes a branch for processing or calls another Servlet in response to a request from the Web browser and returns the result to the Web browser.

JSP (Java Server Pages) may be used instead of a Servlet. JSP is pages that are implemented in Java® and displayed on a screen. For example, this technology can be used to write a Java® code in an HTML (HyperText Markup Language) file to dynamically generate pages. JSP can be used in combination with a Servlet.

Servlets and JSP exchange data mainly through application objects (for example, Beans) stored in the server (hereinafter referred to as "server objects"). The developers of such Web application programs must give consideration to complex screen transitions (the transition relations between pages) and dependencies between server objects required by the programs. Accordingly, such Web applications are prone to errors by the developers.

One known method for assisting development of a Web application using Servlets and JSP pages is to create Servlets, JSP, and Beans as components and define the correspondence between the components to automatically generate the codes (for example a technique described in Japanese Published Unexamined Patent Application No. 2001-344105). This method assists the developer by clearly indicating the correspondence between components and automatically generating their corresponding codes.

However, the method disclosed in Patent Document 1 cannot detect errors in a Web application that may appear when the application is actually run. That is, although the method assists the developer in designing and creating a Web application, it does not enable the developer to identify errors that may occur at actual runtime of the Web application in advance.

If a Web application having inconsistencies in its internal design is implemented, bugs whose sources are difficult to identify may occur after the implemented components are combined, which necessitates the developer to reexamine the internal design of the application. In many cases, components of a Web application are implemented by many developers after the internal design of the Web application is completed. The internal design includes information about the design of the components such as screen transitions, screens (JSP), and server logics (Servlets). Different components are developed by different developers and inconsistencies between the components are often left undetected. Therefore, before the application is implemented, the application must be carefully checked to see that the internal design does not contain inconsistencies. However, it is not easy to detect inconsistencies because complicated screen transitions and data dependencies must be taken into consideration.

Thus, a need exists to provide a method, an information processing apparatus, and a program for effectively detect inconsistencies in a Web application program before the application program is implemented.

SUMMARY OF THE INVENTION

According to the present invention, there is provided a method for verifying consistency in the design of screen transition of an application program, including: a control flow graph generating step of generating a control flow graph of the application program; a dataflow analyzing step of calculating from the control flow graph the solution of a dataflow problem which occurs in the application program; an inconsistency detecting step of detecting an inconsistency in the application program on the basis of the calculated solution; and a displaying step of displaying information concerning a detected inconsistency.

The present invention treats screen transitions in an application program as a control flow graph and sever objects as variables, and associates analyses of behavior of the application with dataflow problems. The present invention proposes a method for using the solution of each of the dataflow problems to check the validity of an internal design relating to access to server objects of the application program and presenting the result of the validity check to a user. The present invention also proposes a tool and a method that are useful for grasping the operation of the application.

Thus, an inconsistency in an application program can be detected before the application program is implemented. As a result, the frequency of occurrence of serious bugs or bugs whose cause is difficult to find or which are difficult to fix can be reduced in the development of the application program and consequently development costs can be reduced.

BRIEF DESCRIPTION OF THE DRAWINGS

FIG. 1 is a block diagram showing a configuration of an information processing apparatus according to the present invention;

FIG. 2 is a flowchart of an operation of the present invention;

FIG. 3 shows a control flow graph according to an embodiment of the present invention;

FIG. 4 shows a flow graph and a monotonic dataflow system;

FIG. 5 shows a control flow graph according to an embodiment of the present invention;

FIG. 6 shows a Web application model display view according to an embodiment of the present invention;

FIG. 7 shows an exemplary display which is presented if an inconsistency is detected;

FIG. 8 shows an exemplary display which is presented if an inconsistency is detected;

FIG. 9 shows an exemplary display which is presented if an inconsistency is detected;

FIG. 10 is an exemplary display which is presented if an inconsistency is detected;

FIG. 11 shows an exemplary display for presenting screen transitions and corrections to a user;

FIG. 12 shows an exemplary presentation of possible corrections; and

FIG. 13 shows a screen image after a correction is made.

DETAILED DESCRIPTION

While the present invention will be described below with respect to embodiments thereof, the embodiments are not intended to limit the present invention, which is defined in the claims, and not all of the combinations of features described in the embodiments are essential to the inventive solution.

FIG. 1 is a functional block diagram of an information processing apparatus 10 according to an embodiment of the present invention. The information processing apparatus 10 performs information processing and may be a computer. Effects of the present invention may be implemented by the information processing apparatus 10 executing a program of the present invention. The information processing apparatus 10 includes a control unit 300 which processes information, a storage section 500 which stores the program of the present invention and model information of a Web application, and an output section 200 which displays the result of processing. The information processing apparatus 10 may include an input section 100 for receiving inputs from a user.

The information processing apparatus 10 provides the function of editing model information which corresponds to the internal design of a Web application, and works with editors for editing the artifacts (such as JSP and Java☐ classes) corresponding to the internal design components.

The control unit 300 is a central processor, which may be a CPU (Central Processing Unit), which performs processing and controls the program of the present invention and other applications running on the information processing apparatus 10. The control unit 10 includes a control flow graph generating section 310, a dataflow analyzing section 320, and an inconsistency detecting section 330.

The control flow graph generating section 310 generates a control flow graph from screen transition information and internal design information of a Web application. The data flow analyzing section 320 calculates from the control graph solutions for dataflow problems that occur in a Web application. The inconsistency detecting section 330 detects inconsistencies in the Web application program on the basis of the calculated solution. The correcting section 340 presents possible corrections for resolving inconsistencies and receives an input from a user for selecting one of the possible corrections. Alternatively, the correcting section 340 may accepts a correction input by the user that is not presented by the correcting section 340.

The storage section 500 stores an operating system (OS), applications, model information of a Web application and the like of the information processing apparatus 10. That is, the storage section 500 stores programs and data handled in the information processing apparatus 10. The storage section 500 may be a memory or a hard disk of the computer.

The output section 200 displays the result of processing by the information processing apparatus 10. For example, the output section 200 displays detected inconsistencies in a Web application. The output section 200 may be a CRT display or a liquid-crystal display.

The input section 100 receives an input from the user and provides the input information to the control unit 300. After an inconsistency is detected in a Web application, the input section 100 receives an input from a user for correcting the inconsistency. The input section 100 may be an input device such as a keyboard and a mouse.

A process for detecting inconsistencies in the design information concerning a Web application according to the present invention will be described with reference to FIG. 2. First, to input the design information of the Web application to the information processing apparatus 10, model information based on an internal design and screen transition information is input through the input_section_100 (S200). Model information is information on the internal design of a Web application which is held by this tool and is to be edited. Information to be edited may be pages, actions, and action results. The term action refers to a unit of logic executed on the server in response to a request from a browser or another action. The term action result refers to a code or a character string that will represent the result of execution of an action. If the user does not directly input a model, the Web application is reversely analyzed from the source code of the Web application (S300). This reverse analysis extracts information that represents the nodes in a control flow graph and information about the relation between the nodes (such as screen transitions and references between server objects).

Then, a control flow graph is generated from the extracted information such as the information about nodes (S400). FIG. 3 shows an exemplary control flow graph 30. The control flow graph 30 is a type of directed graph to which a dataflow analysis technique is applied. A dataflow analysis technique is a common method for resolving various dataflow problems in a model of a program code represented by a directed graph ([Reference 1] Aho A. V., Sethi R., and Ullman J. D.: Compilers: Principles, Techniques and Tools, Addison-Wesley, 1986. [Reference 2] Hanz Zima and Barbara Chapman: Supercompilers for parallel and vector computers, Addison-Wesley, 1990).

Typical dataflow problems in a dataflow analysis technique include:
1. Reaching definition
2. Available expression
3. Live variable.

These dataflow problems will be described later with respect to specific data flow problems in the present invention.

The control flow graph 30 is used to carry out dataflow analysis for calculating solutions for dataflow problems (S500). In the dataflow analysis, dataflow problems, such as how a server object is defined, or whether an existing server object is valid for a Web application, are solved.

Based on the solutions of the dataflow problems, inconsistencies are detected (S600). An inconsistency in a Web application may be a reference to a nonexistent server object, generation of a useless server object, or a redundant server object left unremoved. If an inconsistency is detected, information about the inconsistency and a correction for resolving the inconsistency are presented (S700). Then, if a correction is specified by the user (S800), the correction is made (S900).

The control flow graph 30 will be described below in detail with reference to FIG. 3. First, the control graph 30 as shown in FIG. 3 is built from information about the internal design and screen transitions in the Web application or from the source code of the Web application as stated above. The control flow graph 30 contains the nodes of three pages (logonPage, menuPage, and erropage), the nodes of two actions (doLogon and doLogoff), and the nodes of three action results (ActionResult) (OK, NG, and DONE) linked to from the action nodes.

The control flow graph 30 will be described by way of example. The control flow graph 30 represents a process in which a user uses a Web application to perform a login. The Web application starts at the node 31 that displays a page for login (logonPage). A login by the user is accepted and the action node 32 (dologon) is reached, at which determination is made as to whether the login is allowed or not. From the action page, the flow branches the action result nodes (33 or 34) indicating that the login is allowed (OK) or not (NG). If the logon is OK, the flow reaches the node (35) at which the next page (menu) is displayed. If a logoff action is performed, the flow reaches the node 37 for logoff and then reaches the node 38 of the action result (Done) and returns to the node 31 of the logon page.

A piece of dataflow information α40, 41, 42 is added to each of three nodes (menuPage, OK, and DONE) out of the nodes of the three types. The dataflow information α40, 41, 42 describes the server object to be accessed when the screen transition goes through a node.

Here, a server object is an object in the server which is identified by a name-scope pair. More specifically, server objects are objects stored in ServletRequest object (request scope), HttpSession object (session scope), or ServletContext object (application scope) which are defined in Servlet API.

The control flow graph 30 generated in the control flow graph generating section 310 has the following features.

1) There are three types of nodes: Page, Action and Action-Result.

Page represents a component that generates a page such as JSP; Action represents a server logic, and ActionResult represents a branch of the page flow, which depends on the result of execution of a server logic (success or failure). An Action-Result node is linked to only from an Action node.

2) An ActionResult node has information (true/false value) indicating whether the ActionResult is a redirect. If redirect is true, the definition of a server object whose scope is REQUEST disappears at the ActionResult node.

3) A server object (bean) is represented by a triplet: <name, scope, classname>, where scope={REQUEST, SESSION, APPLICATION}. The values have the same meaning that are defined in ServletAPI. A server object is identified by a name-scope pair.

4) Operation α performed on a server object is represented by a pair (op, bean). Zero or more α can be added to one node. Here, op={CREATE, RED, UPDATE, DELETE, MAY_CREATE, MAY_READ, MAY_UPDATE, MAY_DELETE}, having the following means.

CREATE: Generate a bean

READ: Refer to (Read) a bean

UPDATE: Update a beam

DELETE: Delete a bean

MAY_*: "May do" (perform no operation)

The solution of a dataflow problem on the control flow graph 30 defined in this way is computed.

A dataflow problem may be a problem such as, at which point an assignment statement is likely to assign a value to variable A referenced, or conversely, at which point a value assigned to variable A by an assignment statement in a program is likely to be referenced. Particularly, a monotonic dataflow system (MDS) is a generalized system for solving dataflow problems. In the present invention, MDS is used for dataflow analysis through a server object in each component of a Web application.

The algorithm provided below is a general iterative algorithm for MDS extracted from Reference 2 given above.

TABLE 1

Input: G=(N,E,s) and MDSΩ = (L,∧,F,G,FM)
Output: INF: N → L
begin INF(s): = NULL, for every n ∈ N-{s} do INF(n): =1 end for; repeat
    stable: = true;
    for every n ∈ N-{s} in rPostorder do
new: = ∧fn'(INF(n'));
n' ∈ pred(n)
if new ≠ INF(n) then
    INF(n): = new;
    stable: =false
fi end for until stable end With this algorithm, dataflow information INF (n) concerning each node n can be obtained. The lattice INF (n)∈L indicates dataflow information concerning node n, the function fn: L→L represents conversion (propagation) of dataflow information when passing through node n, and the meet operation ^ on L represents composition of dataflow information. FIG. 4 shows a conceptual diagram of functions f and meet operation ^. To solve dataflow problems in practice, a lattice L, namely dataflow information, a meet ^ on L, a function f, and a function pred, which defines the precedent node, must be defined for each problem.

Using the control flow graph 30 described above to solve dataflow problems will be described below. Making use of dataflow problems in the dataflow analysis technique described above, the following dataflow problems will be described. 1) RD (Reaching Definition): Problem with reaching server object definition 2) AB (Available Bean): Problem with an available server object 3) LB (Live Bean): Problem with a live server object These dataflow problems can be solved by applying MDS to analysis of a dataflow through server objects of components of a Web application. AB and LB given above can be obtained as sets of server objects (beans); RD can be obtained as a set of definition points a of server objects (that is, operation is CREATE or UPDATE). These solutions are obtained for each node on the control flow graph 30. The solutions of the dataflow problems concerning node n are denoted as RD [n], AB [n], and LB [n]. RD [n] tells the definitions at which server objects that are likely to exist at node n are defined. AB [n] tells the server objects that "definitely" exist at node n. LB [n] tells the server objects that are likely to be subsequently referenced (likely to undergo READ, or UPDATE, or DELETE).

The solutions RD [n], AB [n], and LB [n] of the dataflow problems are obtained in this way and are used to detect inconsistencies concerning access to server objects, as given below: 1) Inconsistency due to a reference to a nonexistent server object 2) Inconsistency due to a wrong type of server object 3) Inconsistency due to generation of a redundant server object 4) Inconsistency due to unnecessary server object left unremoved.

Each of these inconsistencies will be described below.

1) Inconsistency Due to Reference to a Nonexistent Server Object

This inconsistency occurs if a server object is not generated although there is a path through which a Web application (Servlet) or a page (JSP) described on the assumption of the existence of that server object is reached. A screen transition containing such a path will cause an error at runtime and therefore is an incorrect screen transition. This problem may be detected as an inconsistency if AB[n] at each node n in the control flow graph does not contain a server object that is declared to be READ accessed at the node n. An exemplary algorithm for the inconsistency detecting section 330 to detect this inconsistency is given below.

TABLE 2

For each node "n" in the control flow graph For access α to a server object declared at "n" if (α.op = READ or α.op = MAY_READ) then if (α.bean is not contained in AB [n]) then α is a reference to a server object that is likely to be nonexistent endif endif end end 2) Inconsistency Due to a Wrong Type of Server Object This inconsistency appears as ClassCastException at runtime of a Web application (Servlet) or a page (JSP) if a server object of a type that is not expected by the Web application (Servlet) or the page (JSP) is stored. This problem may be detected as an inconsistency if the classname differs from the classname of a for a server object at each node n on the control flow graph. An exemplary algorithm for the inconsistency detecting section 330 to detect this inconsistency is given below.

TABLE 3

For each node "n" in the control flow graph For access α to a server object declared at "n" if (α.op = READ or α.op = MAY_READ or α.op = UPDATE or α.op = MAY_UPDATE) then For each entry a of RD [n]
if (a.bean and α.bean are the same server objects) then if (a.bean. classname ≠ α.bean. classname) then the server objects (α and a) are different in type from each other endif
endif end endif end end 3) Generation of a Redundant Server Object This is an inconsistency in which a server object which is never referenced is generated. Although such an inconsistency is not fatal to a Web application, this error degrades the performance and therefore should be eliminated from the internal design. This problem may be detected as an inconsistency if LB [n] does not contain a server object, α.bean, that is declared to be accessed in CREATE or UPDATE at each node n in the control flow graph. An exemplary algorithm for the inconsistency detecting section 330 to detect this consistency is given below.

TABLE 4

For each node "n" in the control flow graph for access α to a server object declared at "n" if (α.op = CREATE or α.OP = MAY_CREATE or α.op = UPDATE or α.op = MAY_UPDATE) then if (α.bean is not contained in LB [n]) then α is redundant endif end end end 4) Inconsistency Due to Unnecessary Server Object Left Unsolved This inconsistency is a case where a server object which can be referenced from nowhere is left unremoved. Although such an inconsistency is not fatal to a Web application, the error degrades the performance and therefore should be eliminated from the internal design. This problem may be detected as an inconsistency if a server object that is contained in AB [n] but not in LB [n] at each node n on the control flow graph is not deleted at n. An exemplary algorithm for the inconsistency detecting section 330 to detect this inconsistency is given below.

TABLE 5

For each node "n" in the control flow graph if (node "n" is ActionResult) then for server object that is contained in AB [n] but not in LB [n] if (b is likely not to be DLETed at "n") b is not necessary at "n" (b should be deleted at "n") end end endif end Detection of an inconsistency by the inconsistency detecting means 330 will be described in detail with reference to FIG. 5. RD and AB of node n3 on the control flow graph 50 in FIG. 5 can be obtained as follows.

$$RD(n3)=\{a1\}, AB(n3)=EMPTY \quad \text{[Formula 1]}$$

To verify the consistency for α2 at node n3, the inconsistency detecting means 330 determines whether or not the server object ("userInfo" in this example) referenced (READ) by α2 is contained in AB (n3). On the other hand, if reference by α2 is MAY_READ, the inconsistency detecting means 330 determines whether or not RD (n3) has an entry in which "userInfo" is defined (CREATE, UPDATE, MAY_CREATE, or MAY_UPDATE). In this example, AB (n3) is empty for α2 (READ). Therefore, the inconsistency detecting means 330 determines that α2 is an error, that is, there is an inconsistency.

An embodiment for displaying an inconsistency detected will be described with respect to FIG. 6. A Web application model display view 60 is a screen image displayed on the output portion 200 of the information processing apparatus 10. On the Web application mode display view 60, components and the relation between them are indicated by icons and arrows. The rectangular icons of the Web browser screen represent pages (JSP) 51, 53, and the gear wheels represent actions (server logics) 52, 54, and the coffee-bean-shaped icon represents a server object 58. The connecting lines between the icons of the pages (JSP) and actions represent screen transitions in the Web application; the connecting lines between the icons of the pages (JSP) and actions and the icon of the server object represent references to the server object.

An example of the display of the Web application model display view 60 that is presented if an inconsistency is detected consists of an screen transition editor 61 and a problem list view 62. If an inconsistency is detected, the inconsistency is displayed as an error (indicated by a cross "x" against a red background) or a warning (indicated by exclamation point "!" against a yellow background) in the problem list view 62. The inconsistent component may be highlighted in the screen transition editor 61 as well. When one of specific problems 66, 67 displayed on the problem list view 62 is selected, the cause of the problem may be displayed on the screen transition editor 61.

FIG. 7 shows an exemplary display which appears on the screen transition editor 61 if "an inconsistency due to a reference to nonexistent server object" is detected. The description 71 of the inconsistency may be displayed for the error 70 on the screen transition editor 61 as shown. In addition, the path 72 that causes the inconsistency may be highlighted.

FIG. 8 shows an exemplary display which appears on the screen transition editor 61 if "an inconsistency due to an inappropriate type of server object" is detected. As shown, the description 82 of the inconsistency may be displayed for the error 81 on the screen transition editor 61. In addition, the action 80 that causes the inconsistency may be highlighted.

FIG. 9 shows an exemplary display which appears on the screen transition editor 61 if "an inconsistency due to generation of a redundant server object" is detected. As shown, the description 91 of the inconsistency may be displayed for the warning 90 may be displayed on the screen transition editor 61.

FIG. 10 shows an exemplary display which appears on the screen transition editor 61 if "an inconsistency due to an unnecessary server object left unremoved" is detected. As shown, the description 102 of the inconsistency may be displayed for the warning 101 on the screen transition editor 61.

The errors 70 and 80 are indicated by an error icon (a white cross (x) in a red box) because they may be bugs in the Web application. The warnings 90 and 101 are indicated by a warning icon (an exclamation point (!) in a yellow triangle) because they may not necessarily be bugs but should be corrected.

With reference to FIG. 11, an embodiment will be described in which screen transition information is organized and presented to a user, an inconsistency is detected, possible corrections are displayed, and a correction is accepted. A screen image 110 consists of an outline view 111 in which components are listed, a screen transition editor 112, a problem list view 113, and a source code editor 114. The source code editor 114 displays the source code of an action 112 relating to an error 115, accepts an input from a user of the source code, and allows the user to edit the code. The screen transition editor 112 graphically displays screen transition information and allows the user to select one of the components, move a component, and connect a component to another. The problem list view 113 displays any problems, including problems detected using the technique according to the present invention as well as compile errors.

For example, when an inconsistency detection button 116 is clicked to execute the inconsistency detection function, dataflow analysis is applied to the screen transition information (model) being edited and inconsistency detection is started. A consistency detected is displayed as an error icon 115 on the relevant icon on the screen transition editor 112 and also displayed as an error in the problem list view 113. In the example in FIG. 11, an inconsistency is detected that the server object "user" referenced in "menus" may not necessarily exist.

The correcting section 340 may present possible corrections 120 to the user as shown in FIG. 12 when the error icon 115 is right-clicked. It is assumed here that correction 580 is selected. Then, a correction code 131 corresponding to the source code of the "do Something" action is inserted (see FIG. 13). The inserted code fragment generates the server object "user" anew. At the same time, a change is made to the model information on the screen transition editor 112 that corresponds to the correction and an action result indicating that "do Something" generates (Create) 113 "user" is displayed. This correction eliminates the inconsistency from the screen transition information and the entry indicating the inconsistency from the problem list view 113.

A method for applying MDS to analysis of a dataflow through server objects of components of a Web application will be described below. As stated earlier, to solve dataflow problems in practice, a lattice L, namely dataflow information, a meet operation ^ on L, a function f, and a function pred defining the precedent node must be defined for each problem.

In particular, to solve the three dataflow problems (RD, AB, LB) described earlier, a dataflow information set L, a meet operation ^ on L, a transfer function fn(X), and a precedent node determining function pred(n) on a directed graph are defined as shown below, for example, and the general iterative algorithm shown in Table 1 is used.

Reaching server object definition $(RD)(L, \hat{}) = PS$
(BEANSPECS),$\cup$)$fn(X)=(X \cap OP\_MAY\_PRE$
$(n))\cup OP\_MAY\_DEF(n)$pred$(n)$:=set of nodes
connecting to $n$     [Formula 2]

Available server object$(AB): (L,\hat{})=(PS(BEANS),\cap)fn$
$(X)=(X \cap PRE(n))\cup DEF(n)$pred$(n)$:=set of nodes
connecting to $n$     [Formula 3]

Live server object $(LB)(L,\hat{})=(PS(BEANS),\cup)fn(X)=$
$(X \cap MAY\_PRE(n))\cup MAY\_USE(n)$pred$(n)$:=set
of nodes connecting from $n$     [Formula 4]

Here, BEANS is a collection of all server object beans appearing on a control flow graph, and BEANSPECS is a set of declarations α of access to all server objects appearing on a control flow graph. PS represents a power set.

The functions appearing in the definition are defined as follows.

DEF$(n):=\{b \in$BEANS: node $n$ includes α that is
op=CREATE or UPDATE and α is an operation on $b\}$ MAY_DEF$(n):=\{b \in$BEANS: node $n$ includes α that is
op=CREATE or UPDATE or MAY_CREATE or
MAY_UPDATE and α is an operation on $b\}$ USE$(n):=\{b \in$BEANS: node $n$ includes α that is
op=READ or UPDATE and α is an operation on $b\}$ MAY_USE$(n):=\{b \in$BEANS: node $n$ includes α that is
op=READ or UPDATE or MAY_READ or
MAY_UPDATE and α is an operation on $b\}$ PRE$(n)$:=BEANS−MAY_DEF$(n)$ MAY_PRE$(n)$: BEANS−DEF$(n)$ OP_DEF$(n):=\{a \in$BEANSPECS: op of α is CREATE
or UPDATE$\}$ OP_MAY_DEF$(n):=\{\alpha \in$BEANSPECS: op of α is
CREATE, UPDATE, MAY_CRETE, or
MAY_UPDATE$\}$ OP_USE$(n):=\{\alpha \in$BEANSPECS: op of α is READ or
UPDATE$\}$ OP_PRE$(n)$:=BEANSPECS−OP_MAY_DEF$(n)$ OP_MAY_PRE$(n)$:=BEANSPECS−OP_DEF$(n)$     [Formula 5]

Operations $\cup$ and $\cap$ on the set of beans and operations □ and $\cap$ on the set of αs are defined as follows.

Operations on set B of beans B1 and B2 are sets of
beans. □(union)$B1$□$B2=\{b$□BEANS:$b$□$B1$ or
$b$□$B2\}$     [Formula 6]

$\cap$(Intersection)

$B1 \cap B2 = \{b$□BEANS:$b$□$B1$ or $b$□$B2\}$

Operations on set A of αs A1 and A2 are sets of αs.
□(Union)$A1$□$A2$=union$(A1,A2)$     [Formula 7]

$\cap$(Intersection)

$A1 \cap A2$=intersection$(A1,A2)$

The functions union and intersection appearing in the definition above are calculated according to the following algorithm.

TABLE 6

Set union (Set a1, Set a2) { Set r = a1. clone ( );
for (Iterator it = a2. iterator ( ); it. hasNext ( ); ) {
   Info i2 = (Info) it. next ( );
   Info a = findInfo(r, i2. bean);
   if (a = null) {
r. put (i2. clone ( ));
   } else {
   0.a. op = union (a.op, a2. op);
   0.

TABLE 6-continued

```
0.a. list. add (a2);
0.
}
}
return r;
} Info findInfo(Set a, ObjInfo bean) {
for (Iterator it = a.iterator( ); it. hasNext( ); ) { Info i =
(Info) it. next ( ); if (bean. equals (i. bean)) {
return i;
}
}
}
return null;
}
Set intersection(Set A1, Set A2) { Set r = new Set ( );
for (Iterator it = a1. iterator( ); it hasNext( );) { Info i1 =
(Info) it. next ( ); a2 = A2. get (i1. bean); if (a != null) {
a = i1. clone ( );
a. op = intersection(a. op, a2. op);
a. list. add (a2);
r. put (a);
}
}
return r;
}
Op union(Op op1, Op op2) { Op newOp = op1;
for (Iterator it = op2. iterator( ); it. hasNext( ); ) {
Op p = (Op) it. next ( );
    newOp. add (p);
} return newOp; }
Op intersection(Op op1, Op op2) { Op newOp = NOP; for (Iterator it =
op1. iterator( ); it. hasNext( ); ) {
Op p = (Op) it. next ( );
    if (op2.contains(p)) {
newOp. add (p);
}
}
return newOp;
}
```

Here class Op is defined as a class representing the power set of op={CREATE, READ, UPDATE, DELETE, MAY_CREATE, MAY_READ, MAY_UPDATE, MAY_DELETE} as follows.

TABLE 7

```
class Op extends Set { //Returns true if the power set represented by
the object fully
includes the argument o boolean contains(Op o); //Adds the argument o
to the power set represented by the object void add(Op op);
}
Class Info is defined as a class of the object that represents α, as follows.
Class Info { Op op;
ObjInfo bean; List List; }
```

Class ObjInfo is defined as the class that represents information concerning the server object, as follows.

TABLE 8

```
class ObjInfo { String name; Scope scope; // REQUEST, SESSION, or
APPLICATION String classname;
public int hashCode ( ) {
return name. hashCode ( ) + scope. hashCode ( );
}
public boolean equals(Object o) {
if (o = null || !(o instanceof ObjInfo)) {
return false; } return (name. equals (o. name) && scope. equals
(o. scope));
} }
```

A program provided to and executed by the information processing apparatus 10 may include functional components such as a device driver, a read module for processing information, an executing module, and an OS processing module. The program to be provided to the information processing apparatus 10 is stored on a program recording medium such as a flexible disk, a CD-ROM, or an IC memory card and is provided by a user to the information processing apparatus 10. The program is read from the program recording medium and is installed and executed in the information processing apparatus 10.

While the present invention has been descried with respect to embodiments thereof, the technical scope of the present invention is not limited to what described with the embodiments. Various modifications or improvements can be made to the embodiments. It will be apparent from the claims that embodiments to which such modifications and improvements are made also fall within the scope of the technical scope of the present invention.

We claim:

1. An information processing apparatus that verifies consistency in a Web application program, comprising:
    a control flow graph generating section for generating a control flow graph representing one or more screen transitions associated with the application program;
    a dataflow analyzing section for calculating from the control flow graph a solution of a dataflow problem which occurs in the application program;
    an inconsistency detecting section for detecting at least one inconsistency in the application program on the basis of the calculated solution; and
    an output section for displaying information concerning the detected inconsistency;
    wherein the control flow graph comprises a plurality of nodes;
    wherein at least first and second Web pages associated with the Web application program are represented by corresponding at least first and second nodes of the control flow graph;
    wherein a transition between the first Web page and the second Web page is represented by one or more nodes of the control flow graph in addition to the first and second nodes; and
    wherein the control flow graph is generated based at least in part on model information based on an internal design and screen transition information of the application program, the model information being distinct from source code of the application program.

2. The information processing apparatus according to claim 1, wherein the at least one inconsistency comprises an inconsistency concerning server objects in the application program.

3. The information processing apparatus according to claim 2, wherein the inconsistency detecting section detects a reference to a nonexistent server object.

4. The information processing apparatus according to claim 2, wherein the inconsistency detecting section detects that a server object is not of an appropriate type.

5. The information processing apparatus according to claim 2, wherein the inconsistency detecting section detects generation of a redundant server object.

6. The information processing apparatus according to claim 2, wherein the inconsistency detecting section detects a server object that is not referenced from anywhere.

7. The information processing apparatus according to claim 1, further comprising a correcting section for presenting information for correcting the inconsistency on the basis of the information concerning the inconsistency.

8. The information processing apparatus according to claim 7, wherein the correction section receives an input concerning a correction from a user and corrects the inconsistency in accordance with the input correction.

9. The information processing apparatus according to claim 1, wherein the transition between the first Web page and the second Web page is represented by at least one node representing an action for selecting whether or not the transition should be made, and at least one node representing a result of the action.

10. The infatuation processing apparatus according to claim 1, wherein the dataflow analyzing section calculates the solution of a reaching definition problem.

11. The information processing apparatus according to claim 1, wherein the dataflow analyzing section calculates an available server object as the solution of the dataflow problem.

12. The information processing apparatus according to claim 1, wherein the dataflow analyzing section calculates as the solution of the dataflow problem one or more server objects which are likely to be referenced at each node of the control flow graph.

13. A method for verifying consistency in a Web application program, comprising:
a control flow graph generating step of generating a control flow graph representing one or more screen transitions associated with the application program;
a dataflow analyzing step of calculating from the control flow graph a solution of a dataflow problem which occurs in the application program;
an inconsistency detecting step of detecting an inconsistency in the application program on the basis of the calculated solution; and
a displaying step of displaying information concerning the detected inconsistency;
wherein the steps are performed by a computer;
wherein the control flow graph comprises a plurality of nodes;
wherein at least first and second Web pages associated with the Web application program are represented by corresponding at least first and second nodes of the control flow graph;
wherein a transition between the first Web pane and the second Web page is represented by one or more nodes of the control flow graph in addition to the first and second nodes; and
wherein the control flow graph is generated based at least in part on model information based on an internal design and screen transition information of the application program, the model information being distinct from source code of the application program.

14. The method according to claim 13, wherein the inconsistency detecting step detects an inconsistency concerning server objects in the application program.

15. The method according to claim 14, wherein the inconsistency detecting step detects a reference to a nonexistent server object.

16. The method according to claim 14, wherein the inconsistency detecting step detects that a server object is not of an appropriate type.

17. The method according to claim 14, wherein the inconsistency detecting step detects generation of a redundant server object.

18. The method according to claim 14, wherein the inconsistency detecting step detects the presence of a server object that is not referenced from anywhere.

19. The method according to claim 13, further comprising a correcting step of presenting information for correcting the inconsistency on the basis of the information concerning the inconsistency.

20. The method according to claim 19, wherein the correcting step receives an input concerning a correction from a user and corrects the inconsistency in response to the input correction.

21. The method according to claim 13, wherein the control flow graph the transition between the first Web page and the second Web page is represented by at least one node representing an action for selecting whether or not the transition should be made, and at least one node representing a result of the action.

22. The method according to claim 13, wherein the dataflow analyzing step calculates the solution of a reaching definition problem.

23. The method according to claim 13, wherein the dataflow analyzing step calculates an available server object as the solution of the dataflow problem.

24. The method according to claim 13, wherein the dataflow analyzing step calculates as the solution of the dataflow problem a server object that is likely to be referenced at each of the control flow graph.

25. A computer readable storage medium having encoded thereon a computer program for verifying consistency in designing screen transition of a Web application program, comprising:
a control flow graph generating function of generating a control flow graph representing one or more screen transitions associated with the application program;
a dataflow analyzing function of calculating from the data flow graph the solution of a dataflow problem which occurs in the application program;
an inconsistency detecting function of detecting inconsistency in the application program on the basis of the calculated solution; and
a displaying function of displaying information concerning a detected inconsistency;
wherein the control flow graph comprises a plurality of nodes;
wherein at least first and second Web pages associated with the Web application program are represented by corresponding at least first and second nodes of the control flow graph;
wherein a transition between the first Web page and the second Web page is represented by one or more nodes of the control flow graph in addition to the first and second nodes; and
wherein the control flow graph is generated based at least in part on model information based on an internal design and screen transition information of the application program, the model information being distinct from source code of the application program.

26. The computer readable storage medium according to claim 25, wherein the inconsistency detecting function detects an inconsistency concerning a server object in the application program.

* * * * *